United States Patent
Zhuang et al.

(10) Patent No.: US 11,621,926 B2
(45) Date of Patent: *Apr. 4, 2023

(54) NETWORK DEVICE AND METHOD FOR SENDING BGP INFORMATION

(71) Applicant: Huawei Technologies Co., Ltd., Shenzhen (CN)

(72) Inventors: Shunwan Zhuang, Beijing (CN); Zhenbin Li, Beijing (CN); Baohua Song, Shenzhen (CN); Yuanbin Yin, Beijing (CN); Guoyi Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

This patent is subject to a terminal disclaimer.

(21) Appl. No.: 17/033,260

(22) Filed: Sep. 25, 2020

(65) Prior Publication Data

US 2021/0014175 A1    Jan. 14, 2021

Related U.S. Application Data

(63) Continuation of application No. 15/412,890, filed on Jan. 23, 2017, now Pat. No. 10,826,846, which is a (Continued)

(30) Foreign Application Priority Data

Jul. 23, 2014   (CN) .......................... 201410352943.0

(51) Int. Cl.
*H04L 49/25* (2022.01)
*H04L 41/0853* (2022.01)
(Continued)

(52) U.S. Cl.
CPC .......... *H04L 49/25* (2013.01); *H04L 12/4633* (2013.01); *H04L 41/0853* (2013.01); *H04L 67/104* (2013.01); *H04L 45/04* (2013.01)

(58) Field of Classification Search
None
See application file for complete search history.

(56) References Cited

U.S. PATENT DOCUMENTS

| | | | |
|---|---|---|---|
| 6,553,423 B1 * | 4/2003 | Chen ..................... | H04L 69/163 709/230 |
| 7,782,866 B1 | 8/2010 | Walsh et al. | |
| (Continued) | | | |

FOREIGN PATENT DOCUMENTS

| | | |
|---|---|---|
| CN | 101155135 A | 4/2008 |
| CN | 101610208 A | 12/2009 |
| (Continued) | | |

OTHER PUBLICATIONS

U.S. Appl. No. 15/412,890, filed Jan. 23, 2017.
(Continued)

*Primary Examiner* — Hassan A Phillips
*Assistant Examiner* — Gautam Sharma
(74) *Attorney, Agent, or Firm* — Leydig, Voit & Mayer, Ltd.

(57) ABSTRACT

A network device creates a virtual border gateway protocol (BGP) peer and the BGP peer is enabled all BGP capability data configured in the network device. A BGP monitoring protocol (BMP) module of the network device acquires the enabled BGP capability by using a BGP message. According to the solution of the embodiment, the network device obtains all BGP capabilities configured in the network device and sends all the BGP capabilities to a monitoring server, so that the monitoring server can fully understand actual capability supported by the entire network, further (Continued)

providing an effective basis for deployment of and decision on the entire network.

20 Claims, 6 Drawing Sheets

Related U.S. Application Data continuation of application No. PCT/CN2015/080438, filed on May 30, 2015.

(51) Int. Cl.
*H04L 12/46* (2006.01)
*H04L 67/104* (2022.01)
*H04L 45/02* (2022.01)

(56) References Cited

U.S. PATENT DOCUMENTS

| | | | | |
|---|---|---|---|---|
| 8,953,590 | B1* | 2/2015 | Aggarwal | H04L 12/1886 370/409 |
| 10,826,846 | B2* | 11/2020 | Zhuang | H04L 41/0853 |
| 2002/0051449 | A1* | 5/2002 | Iwata | H04L 45/04 370/386 |
| 2004/0221296 | A1* | 11/2004 | Ogielski | H04L 45/00 719/313 |
| 2005/0047413 | A1* | 3/2005 | Ilnicki | H04L 45/42 370/392 |
| 2005/0050225 | A1* | 3/2005 | Tatman | H04L 45/04 709/244 |
| 2006/0164995 | A1* | 7/2006 | Djernaes | H04L 45/306 370/238 |
| 2006/0171404 | A1* | 8/2006 | Nalawade | H04L 45/28 370/428 |
| 2008/0089348 | A1* | 4/2008 | Appanna | H04L 45/02 370/503 |
| 2012/0290716 | A1* | 11/2012 | Ogielski | H04L 43/065 709/224 |
| 2013/0117449 | A1* | 5/2013 | Hares | H04L 45/04 709/225 |
| 2013/0322437 | A1 | 12/2013 | Raszuk et al. | |
| 2014/0086253 | A1* | 3/2014 | Yong | H04L 49/70 370/395.53 |
| 2014/0136714 | A1* | 5/2014 | Garcia De Blas | H04L 47/70 709/226 |
| 2014/0269702 | A1* | 9/2014 | Moreno | H04L 61/5038 370/390 |
| 2015/0304206 | A1* | 10/2015 | Filsfils | H04L 45/46 709/238 |
| 2015/0365321 | A1* | 12/2015 | Maslak | H04L 45/44 709/218 |
| 2016/0134526 | A1* | 5/2016 | Maino | G06F 9/45558 709/226 |
| 2017/0134308 | A1* | 5/2017 | Zhuang | H04L 49/25 |
| 2018/0287945 | A1* | 10/2018 | Diaz | H04L 45/741 |

FOREIGN PATENT DOCUMENTS

| | | |
|---|---|---|
| CN | 102404155 A | 4/2012 |
| CN | 102594714 A | 7/2012 |
| CN | 102761482 A | 10/2012 |
| CN | 103269286 A | 8/2013 |
| WO | 2012168229 A1 | 12/2012 |

OTHER PUBLICATIONS

J. Scudder et al., "BGP Monitoring Protocol draft-ietf-grow-bmp-07," total 44 pages, IETF (Oct. 22, 2012).

J. Scudder et al., "Capabilities Advertisement with BGP-4," Request for Comments:5492, total 14 pages, IETF (Feb. 2009).

Aboba et al., "Extensible Authentication Protocol (EAP) Key Management Framework," Network Working Group, Request for Comments: 5247, Updates: 3748, Category: Standards Track, RFC5247, (Aug. 2008).

Haskin et al. "A BGP/IDRP Route Server alternative to a full mesh routing," Network Working Group, RFC1863, Category: Experimental, (Oct. 1995).

Gredler et al., "North-Bound Distribution of Link-State and TE Information using BGP draft-ietf-idr-ls-distribution-02," Internet Engineering Task Force, XP15092304, IETF Trust, pp. 1-43, Geneva, Switzerland (Feb. 24, 2013).

Zhuang et al., "Monitoring BGP Capabilities Using BMP draft-zhuang-grow-monitoring-bgp-capabilities-01," Internet Engineering Task Force, XP15118824, IETF Trust, pp. 1-7, Geneva, Switzerland (Mar. 13, 2017).

Scudder et al., "BGP Monitoring Protocol draft-ietf-grow-bmp-07," Internet Engineering Task Force, IETF Trust, pp. 1-22, Geneva, Switzerland (Oct. 22, 2012).

Scudder et al., "Capabilities Advertisement with BGP-4," Internet Engineering Task Force, RFC5492, IETF Trust, pp. 1-7, Geneva, Switzerland (Feb. 2009).

Patel et al., "Use Cases for an Interface to BGP Protocol draft-keyupate-i2rs-bgp-usecases-00.txt," Internet Engineering Task Force, IETF Trust, pp. 1-15, (Mar. 11, 2013).

Lougheed et al., "A Border Gateway Protocol (BGP)," RFC1105, pp. 1-17, (Jun. 1989).

Lougheed et al., "A Border Gateway Protocol (BGP)," RFC1163, pp. 1-29, (Jun. 1990).

Lougheed et al., "A Border Gateway Protocol 3 (BGP-3)," RFC1267, pp. 1-35, (Oct. 1991).

Rekhter et al., "A Border Gateway Protocol 4 (BGP-4)," The Internet Society, RFC 4271, pp. 1-104, (Jan. 2006).

* cited by examiner

NETWORK DEVICE AND METHOD FOR SENDING BGP INFORMATION

CROSS-REFERENCE TO RELATED APPLICATIONS

This application is a continuation of U.S. patent application Ser. No. 15/412,890, filed on Jan. 23, 2017, which is a continuation of International Application No. PCT/CN2015/080438, filed on May 30, 2015, which claims priority to Chinese Patent Application No. 201410352943.0, filed on Jul. 23, 2014. The disclosures of the aforementioned applications are hereby incorporated by reference in their entireties.

TECHNICAL FIELD

The embodiments of the present application relate to the field of communications, and particularly, to a network device and method for sending BGP information.

BACKGROUND

The border gateway protocol (BGP) is a dynamic routing protocol operating on an autonomous system (AS) and is typically configured on a network device. The BGP generally can support a number of capabilities, for example, IPv4 unicast, IPv4 multicast, IPv6 unicast, and other multiple-protocol extended capabilities, and quantities and types of capabilities supported by different BGPs may be different. In terms of a network device configured with the BGP, generally not all capabilities supported by the configured BGP are enabled, but currently required BGP capabilities are enabled according to current task requirement.

In order to effectively monitor and manage operating statuses of the BGP configured on each network device in a network, a current method is that a monitoring server acquires BGP information of each network device in the network to centrally monitor and manage the network device configured with the BGP in the network. By way of an example of a flow in which the monitoring server acquires the BGP information, after a BGP connection is established between network devices A and B (or between peers) configured with the BGP, taking the network device A as an example, the network devices A and B negotiate about their own enabled BGP capabilities by using a packet according to a BGP rule, and the network device A further includes a BGP monitoring protocol (BMP) module capable of establishing a connection with the monitoring server, where the BMP module can acquire the enabled BGP capabilities of the network device A and the enabled BGP capabilities of the network device B according to the negotiated enabled BGP capabilities. Therefore, when the BMP module of the network device A sends the configured BGP information of the network device to the monitoring server by using a peer up notification, the BGP capabilities include only the BGP capabilities enabled on the network device A.

However, sending only deployed or enabled BGP capabilities is not enough. The monitoring server needs to acquire all BGP capabilities supported by the network devices configured with the BGP in the network, namely including enabled and disabled BGP capabilities, so that the monitoring server can know comprehensively real capabilities supported by the entire network, further providing an effective basis for deployment of and decision on the entire network.

SUMMARY

Embodiments of the application provide a network device and method for sending BGP information, so that the network device can send all capabilities supported by a configured BGP.

According to a first aspect, an embodiment of the application provides a network device for sending BGP information, where the network device includes a BGP module and a BMP module, where the BMP module is configured to establish a BMP connection with a monitoring server, and send to the BGP module a request for acquiring a capability information set;

the BGP module is configured to receive the request for acquiring the capability information set; traverse BGP capability data stored in the BGP module to acquire all BGP capability data configured in the network device; and send the acquired all BGP capability data to the BMP module; and the BMP module is further configured to send to the monitoring server all the BGP capability data and a device identifier of the network device.

In a first possible implementation manner of the first aspect, the sending to the monitoring server all the BGP capability data and a device identifier of the network device is implemented by sending an initial capability information set message.

With reference to the first possible implementation manner of the first aspect, in a second possible implementation manner, all the BGP capability data is encapsulated in an optional parameter field of the initial capability information set message.

With reference to the first or second possible implementation manner of the first aspect, in a third possible implementation manner, the network device further includes:

the monitoring server, configured to acquire the initial capability information set message sent by the BMP module; and acquire, from the initial capability information set message, all the BGP capability data corresponding to the network device.

With reference to the first or second or third possible implementation manner of the first aspect, in a fourth possible implementation manner, when the network device establishes a BGP connection with another network device, the BMP module is further configured to send a peer up notification targeted at the network device to the monitoring server, where the peer up notification message carries BGP capabilities enabled in the network device.

According to a second aspect, an embodiment of the application provides a method for sending BGP information, where the method is applicable to a network device, the network device includes a BGP module and a BMP module, and the method includes:

establishing, by the BMP module, a BMP connection with a monitoring server;

sending, by the BMP module, a request for acquiring a capability information set to the BGP module;

receiving, by the BGP module, the request for acquiring the capability information set;

traversing, by the BGP module, BGP capability data stored in the BGP module to acquire all the BGP capability data configured in the network device;

sending, by the BGP module, the acquired all BGP capability data to the BMP module; and sending, by the BMP module to the monitoring server, all the BGP capability data and a device identifier of the network device.

In a first possible implementation manner of the second aspect, the sending, by the BMP module to the monitoring server, all the BGP capability data and a device identifier of the network device is specifically: sending, by the BMP module to the monitoring server, an initial capability information set message, where the initial capability information set message carries all the BGP capability data and the device identifier of the network device.

With reference to the first possible implementation manner of the second aspect, in a second possible implementation manner, the method further includes:

encapsulating, by an optional parameter field of the initial capability information set message, all the BGP capability data is encapsulated.

With reference to the first or second possible implementation manner of the second aspect, in a third possible implementation manner, the method further includes:

acquiring, by the monitoring server, the initial capability information set message sent by the BMP module; and acquiring, by the monitoring server from the initial capability information set message, all the BGP capability data corresponding to the network device.

With reference to the first or second or third possible implementation manner of the second aspect, in a fourth possible implementation manner, when the network device establishes a BGP connection with another network device, the BMP module sends a peer up notification targeted at the network device to the monitoring server, where the peer up notification message carries BGP capabilities enabled in the network device.

According to a third aspect, an embodiment of the application provides a network device for sending BGP information, where the network device includes a BGP module and a BMP module, where the BMP module is configured to send to the BGP module a request for acquiring a capability information set;

the BGP module is configured to receive the request for acquiring the capability information set; and traverse BGP capability data stored in the BGP module to acquire all BGP capability data configured in the network device;

the network device is configured to create a virtual peer on which all the BGP capability is enabled; and the BMP module is further configured to send a first peer up notification targeted at the virtual peer to a monitoring server, where the first peer up notification carries all the BGP capability data enabled in the virtual peer, and location information in the first peer up notification is a device identifier of the network device.

In a first possible implementation manner of the third aspect, the BMP module is further configured to send a second peer up notification targeted at the network device to the monitoring server, where the second peer up notification carries the BGP capabilities enabled in the network device and the device identifier of the network device.

With reference to the third aspect or the first possible implementation manner of the third aspect, in a second possible implementation manner, the monitoring server is configured to receive the first peer up notification; and acquire, from the first peer up notification, all the BGP capability data corresponding to the network device.

According to a fourth aspect, an embodiment of the application provides a method for sending BGP information, where the method is applicable to a network device, the network device includes a BGP module and a BMP module, and the method includes:

sending, by the BMP module, a request for acquiring a capability information set to the BGP module;

receiving, by the BGP module, the request for acquiring the capability information set;

traversing, by the BGP module, BGP capability data stored in the BGP module to acquire all the BGP capability data configured in the network device;

creating, by the network device, a virtual peer on which all the BGP capability is enabled; and sending, by the BMP module, a first peer up notification targeted at the virtual peer to a monitoring server, where the first peer up notification carries all the BGP capability data enabled in the virtual peer, and location information in the first peer up notification is a device identifier of the network device.

In a first possible implementation manner of the fourth aspect, the BMP module sends a second peer up notification targeted at the network device to the monitoring server, where the second peer up notification carries the BGP capabilities enabled in the network device and the device identifier of the network device.

With reference to the fourth aspect or the first possible implementation manner of the fourth aspect, in a second possible implementation manner, the monitoring server receives the first peer up notification; and the monitoring server acquires, from the first peer up notification, all the BGP capability data corresponding to the network device.

As can be seen from the technical solutions above, the capability of a network device can be extended so that the network device can acquire all BGP capabilities configured in the network device by means of interaction between a BGP module and a BMP module, and send all the BGP capabilities to the monitoring server by using an extended SMP message, so that the monitoring server can acquire all the BGP capabilities supported by the network device, namely including the enabled and disabled BGP capabilities, so the monitoring server can know comprehensively real capabilities supported by the entire network, further providing an effective basis for deployment of and decision on the entire network.

BRIEF DESCRIPTION OF DRAWINGS

To describe the technical solutions in the embodiments of the present application more clearly, the following briefly introduces the accompanying drawings required for describing the embodiments. The accompanying drawings in the following description show some embodiments of the present application, and a person of ordinary skill in the art may still derive other drawings from these accompanying drawings without creative efforts.

DESCRIPTION OF EMBODIMENTS

Figure 1:
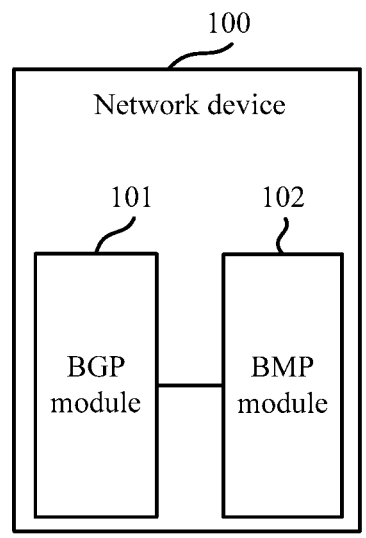
FIG. 1 is a schematic structural diagram of a network device for sending BGP information according to an embodiment of the application.

In the prior art, a network device configured with the BGP typically sends BGP capabilities to a monitoring server by using a peer up notification, and the peer up notification includes not all BGP capabilities but only BGP capabilities enabled in the network device so that the monitoring server cannot know comprehensively BGP capabilities of the network device in a network monitored by the monitoring server, and if the monitoring device needs to manage, upgrade, and extend capability of the network device in the network, the BGP capability information acquired by the monitoring server may not be sufficient to provide a valid support and basis. Moreover the network device sends the peer up notification to the monitoring server on the precondition that the network device has established a BGP connection with other network devices so that the network devices for which the BGP connection has been established negotiate with each other for BGP capabilities on each network device, that is, when the network device configured with the BGP has not established any BGP connection with other network devices, then it will be likely for the monitoring server to fail to acquire the BGP capabilities of the network device.

In view of the technical problem that the monitoring server can acquire only the enabled BGP capabilities of the network device which has established the BGP connection with other network devices, according to the embodiments of the application, capabilities of the network device is extended so that the network device can acquire all the capabilities of the BGP configured in the network device by means of interaction between a BGP module and a BMP module, and sends all the BGP capabilities, for example, initial capability set information carrying all the BGP capabilities on the network device to the monitoring server by using an extended BMP message so that the monitoring server can acquire all the BGP capabilities supported by the network device, namely including the enabled and disabled BGP capabilities, and so that the monitoring server can know comprehensively real capabilities supported by the entire network, further providing an effective basis for deployment of and decision on the entire network.

It shall be noted that the BGP module and the BMP module of the network device in the embodiments of the application are merely executive entities of function required in the embodiments of the application, and the functions in the embodiments of the application may not necessarily be performed by the BGP module and the BMP module in the application, but can alternatively be performed by other modules capable of performing the same functions in the network device. Specifically the network device can be a provider edge router (PE) device in some common application scenarios.

The following clearly describes the technical solutions in the embodiments of the present application with reference to the accompanying drawings in the embodiments of the present application. The described embodiments are some but not all of the embodiments of the present application. All other embodiments obtained by a person of ordinary skill in the art based on the embodiments of the present application without creative efforts should fall within the protection scope of the present application.

Embodiment 1

FIG. 1 is a schematic structural diagram of a network device for sending BGP information according to an embodiment of the application. As illustrated in FIG. 1, the network device 100 includes a border gateway protocol (BGP) module 101 and a border gateway protocol monitoring protocol (BMP) module 102.

The BMP module 102 is configured to establish a BMP connection with a monitoring server, and send to the BGP module a request for acquiring a capability information set.

It shall be noted that the request for acquiring the capability information set is a function performed by the BMP module after extension. The BMP module can act in the network device 100 to send the request for acquiring the capability information set to the BGP module, and interaction between the BGP module and the BMP module in the network device can be in the form of a signaling message, or can be in the form of a recalled function interface, which is not limited by the present application thereto.

The BGP module 101 is configured to receive the request for acquiring the capability information set; traverse BGP capability data stored in the BGP module to acquire all BGP capability data configured in the network device 100; and send the acquired all BGP capability data to the BMP module.

It shall be noted herein that the BGP capability data can be stored in the BGP module respectively in storage spaces of units performing corresponding BGP capabilities, or in a BGP capability set, for example, a BGP capability list. Table 1 depicts a representation of the BGP capability list.

TABLE 1

Capabilities supported by the BGP module on the network device:

| Value | Description |
|---|---|
| 1 | Multiprotocol Extensions for BGP-4 |
| 2 | Route Refresh Capability for BGP-4 |
| 3 | Outbound Route Filtering Capability |

TABLE 1-continued

Capabilities supported by the BGP module on the network device:

| Value | Description | |
|---|---|---|
| 64 | Graceful Restart Capability | |
| 65 | Support for 4-octet AS number capability | |
| 69 | ADD-PATH Capability address family identifier (AFI) and sub-address family identifier (SAFI) supported by BGP multi-protocol extensions | |
| | Multiprotocol Extensions for BGP-4 | AFI = 1, SAFI = 1, IPv4 unicast<br>AFI = 1, SAFI = 2, IPv4 multicast<br>AFI = 1, SAFI = 128, VPNv4 unicast<br>AFI = 1, SAFI = 129, VPNv4 multicast<br>AFI = 2, SAFI = 1, IPv6 unicast<br>AFI = 2, SAFI = 2, IPv6 multicast |

The BGP module traverses the BGP capability data stored in the BGP module (for example, the BGP capabilities respectively stored in the respective storage spaces, or the list as depicted in Table 1) to acquire all the BGP capability data. It shall be noted that although the BGP module can traverse to acquire all the BGP capability data, the BGP module cannot determine, among all the BGP capability data, which BGP capabilities are enabled on the network device, and which BGP capabilities are disabled on the network device.

The BMP module 102 is further configured to send to the monitoring server all the BGP capability data and a device identifier of the network device. Specifically, the BMP module 102 can carry all the BGP capability data, and a device identifier of the network device in an initial capability information set message, and send the initial capability information set message to the monitoring server. More specifically, all the BGP capability data and the device identifier of the network device are carried in an optional parameter field of the initial capability information set message.

Figure 11:
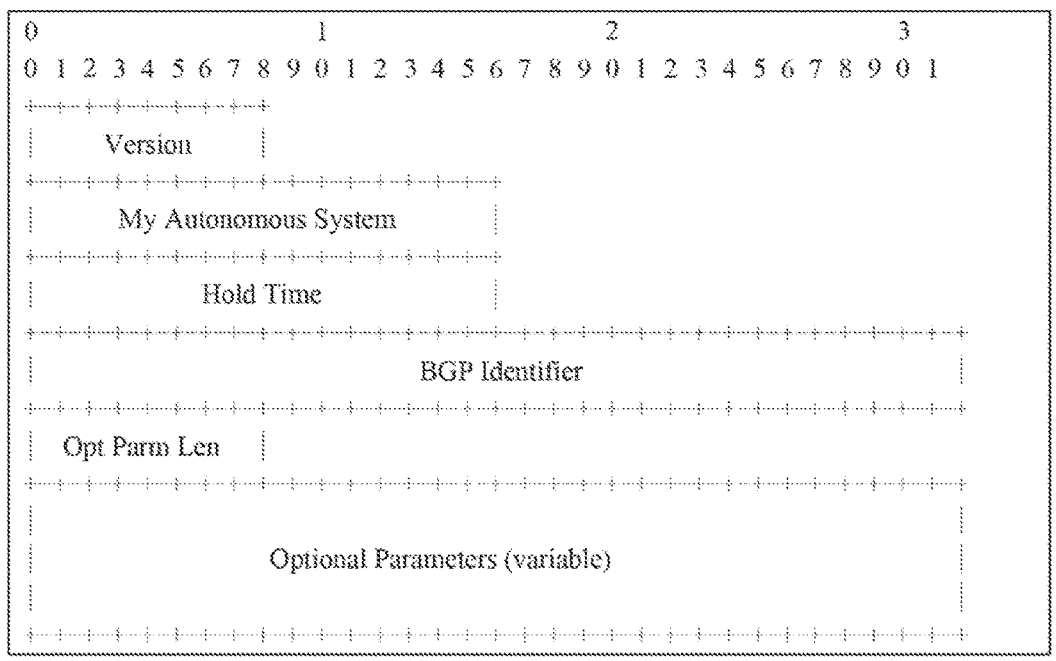
FIG. 11 is a diagram that illustrates fields in an initial capability information set message are encapsulated in the same format as the BGP OPEN Message according to an embodiment of the application.

The initial capability information set message is a BMP message created by extending a BMP rule, and can be used to carry all the BGP capability data, and fields in the initial capability information set message are encapsulated in the same format as the BGP OPEN Message as depicted in FIG. 11.

All the BGP capability data can be encapsulated in a field of the initial capability information set message. Optionally all the BGP capability data can be encapsulated in the field of optional parameters of the initial capability information set message.

Figure 2:
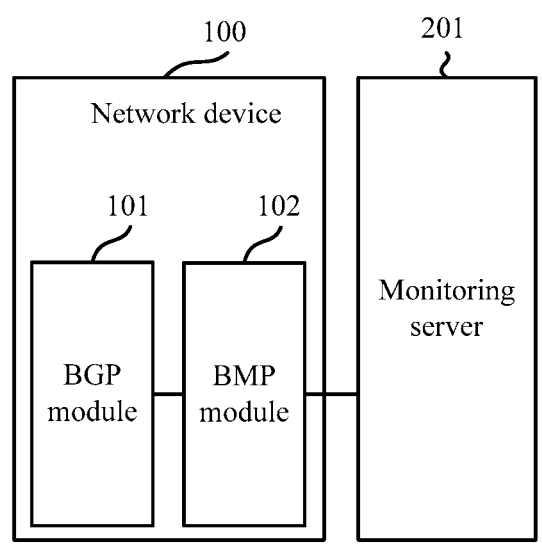
FIG. 2 is a schematic structural diagram of a network device for sending BGP information according to an embodiment of the application.

After the BMP module of the network device sends the initial capability information set message to the monitoring server, the monitoring server further processes the initial capability information set message. Based on the embodiment illustrated in FIG. 1, reference is made to FIG. 2 which is a schematic structural diagram of a network device for sending BGP information according to an embodiment of the application, where:

The monitoring server 201 is configured to acquire the initial capability information set message sent by the BMP module; and to acquire all the BGP capability data corresponding to the network device 100 from the initial capability information set message.

It shall be noted that although the monitoring server 201 can decapsulate the initial capability information set message, and determine all the BGP capability data corresponding to the network device 100 according to the device identifier, the monitoring server 201 cannot determine, among all the BGP capability data, which BGP capabilities are enabled on the network device 100, and which BGP capabilities are disabled on the network device 100. So that it may not be sufficient in accuracy for the monitoring server 201 to take the acquired all BGP capability data as a basis for deployment of and decision on the entire network. In view of this, optionally based on the embodiment illustrated in FIG. 1 or FIG. 2, when the network device 100 establishes a BGP connection with another network device, the BMP module 102 is further configured to send a peer up notification targeted at the network device 100 to the monitoring server 201, where the peer up notification message carries BGP capabilities enabled in the network device 100.

In other words, when the network device 100 establishes the BGP connection with another network device, they negotiate with each other about their enabled BGP capabilities, so that the peer up notification sent from the BMP module to the monitoring server 201 can carry the BGP capabilities enabled in the network device 100. By way of an example, all the BGP capabilities configured in the network device 100 include three BGP capabilities in total, which are IPv4 Unicast, IPv4 Multicast, and IPv6 Unicast respectively, and only one of the BGP capabilities is currently enabled on the network device 100, which is IPv4 Unicast. The monitoring server 201 acquires all the three BGP capabilities including IPv4 Unicast, IPv4 Multicast, and IPv6 Unicast from the initial capability information set message sent by the BMP module, but does not know which capabilities are enabled on the network device 100, and which capabilities are disabled on the network device 100; and the monitoring server 201 acquires the BGP capability enabled in the network device 100, for example, IPv4 Unicast, from the peer up notification targeted at the network device 100 sent by the BMP module, so that the monitoring server 201 determines, among all the BGP capabilities of the network device 100, that the enabled BGP capability is IPv4 Unicast, and the disabled BGP capabilities are IPv4 Multicast and IPv6 Unicast.

In other words, the monitoring server 201 acquires not only all the BGP capability data of the network device 100, but also the enabled BGP capability of the network device 100, so that the monitoring server 201 can distinguish the disabled BGP capabilities from the enabled BGP capability among all the BGP capability data, thereby further improving the knowledge of the monitoring server 201 about all the BGP capability data of the network device 100. If there is a need to extend a function of the network, or to deploy network devices in the network again, the monitoring server 201 can determine, from the acquired enabled BGP capabilities and disabled BGP capabilities of the network devices, which network devices can enable directly the capability to be extended, without being additionally configured with a protocol, thereby improving the efficiency of extending the capability of the network or deploying again the network devices, and saving resources and operating costs of the network.

As can be seen that, the capability of a network device can be extended so that the network device can acquire all BGP capabilities configured in the network device by means of interaction between a BGP module and a BMP module, and send to the monitoring server all the BGP capability data carried in the initial capability information set message by using an extended BMP message, so that the monitoring server can acquire all the BGP capabilities supported by the network device, namely including the enabled and disabled BGP capabilities, so the monitoring server can know comprehensively real capabilities supported by the entire network, further providing an effective basis for deployment of and decision on the entire network.

Embodiment 2

Figure 3:
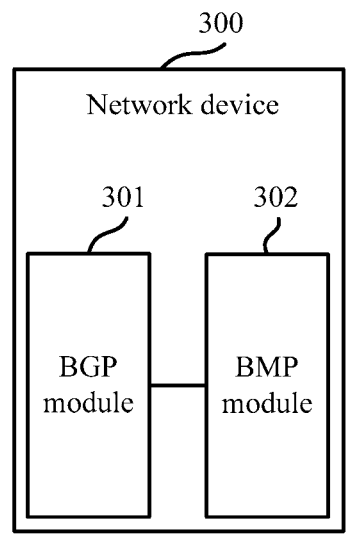
FIG. 3 is a schematic structural diagram of a network device for sending BGP information according to an embodiment of the application.

FIG. 3 is a schematic structural diagram of a network device for sending BGP information according to an embodiment of the application, and as illustrated in FIG. 3, the network device 300 includes a border gateway protocol (BGP) module 301, and a border gateway protocol monitoring protocol (BMP) module 302.

The BMP module 302 is configured to send to the BGP module a request for acquiring a capability information set.

It shall be noted herein the request for acquiring the capability information set is a function performed by the BMP module after extension. The BMP module can act in the network device 300 to send the request for acquiring the capability information set to the BGP module, and interaction between the BGP module and the BMP module in the network device 300 can be in the form of a signaling message, or can be in the form of a recalled function interface, which is not limited by the present application thereto.

The BGP module 301 is configured to receive the request for acquiring the capability information set; and traverse BGP capability data stored in the BGP module and to acquire all BGP capability data configured in the network device 300.

It shall be noted herein that the BGP capability data can be stored in the BGP module respectively in storage spaces of units performing corresponding BGP capabilities, or in a BGP capability set, for example, a BGP capability list. Table 1 depicts a representation of the BGP capability list.

The BGP module traverses the BGP capability data stored in the BGP module (for example, the BGP capabilities respectively stored in the respective storage spaces, or the list as depicted in Table 1) and acquires all the BGP capability data. It shall be noted that although the BGP module can traverse to acquire all the BGP capability data, the BGP module cannot determine, among all the BGP capability data, which BGP capabilities are enabled on the network device, and which BGP capabilities are disabled on the network device.

Alternatively, in an embodiment of the application, the network device 300 is configured to create a virtual peer and all the BGP capability is enabled on the virtual Peer.

In other words, since all the BGP capability data acquired by the BGP module are enabled on the created virtual peer, the BMP module of the network device can thereby acquire the enabled BGP capabilities of the virtual peer, for example, all the BGP capability data configured in the network device.

It shall be noted here although the network device 300 creates the virtual peer, the virtual peer can be created specifically by a functional module in the network device.

The BMP module 302 is further configured to send a first peer up notification targeted at the virtual peer to a monitoring server, where the first peer up notification carries all the BGP capability data enabled in the virtual peer, and location information in the first peer up notification is a device identifier of the network device 300.

Figure 12:
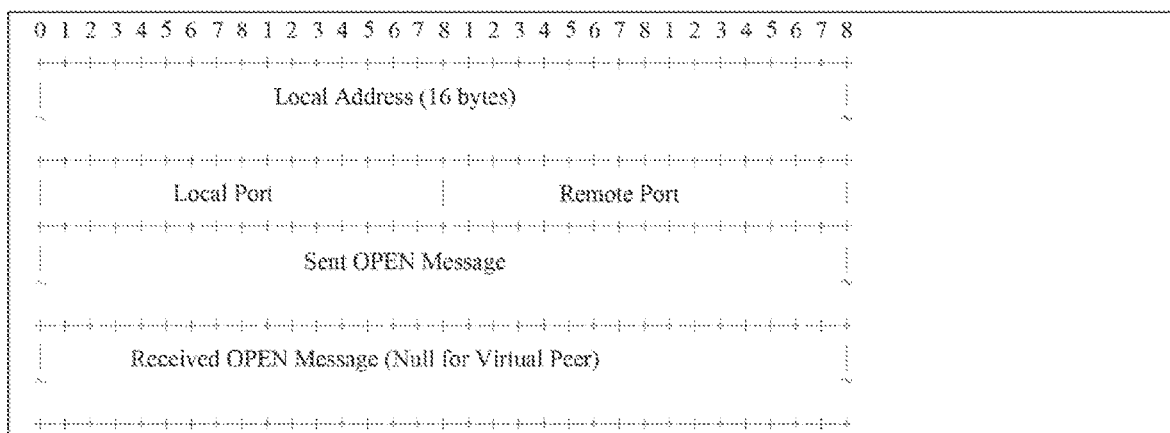
FIG. 12 is a diagram that illustrates a first peer up notification can be encapsulated in the same format as the peer up notification in the prior art according to an embodiment of the application.

The first peer up notification can be encapsulated in the same format as the peer up notification in the prior art as depicted in FIG. 12. However the location information in the first peer up notification is the device identifier of the network device, where the device identifier can be a router ID, and the like, of the network device. Moreover since the virtual peer does not need to receive an open message of the network device for negotiation, the Received Open Message of the first peer up notification can be null.

Figure 4:
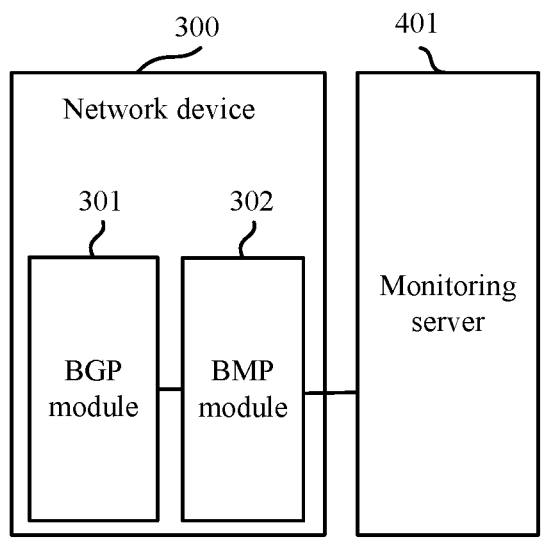
FIG. 4 is a schematic structural diagram of a network device for sending BGP information according to an embodiment of the application.

It shall be noted that upon reception of the first peer up notification, the monitoring server parses the local positional information and obtains the device identifier of the network device, thereby determines all the BGP capability data corresponding to the network device 300. In other words, based on FIG. 3, FIG. 4 is a schematic structural diagram of a network device for sending BGP information according to an embodiment of the application, as illustrated in FIG. 4.

The monitoring server 401 is configured to receive the first peer up notification; and acquire all the BGP capability data corresponding to the network device 300 from the first peer up notification.

However the monitoring server 401 cannot distinguish the BGP capabilities enabled on the network device 300 from the BGP capabilities disabled on the network device among all the BGP capability data.

Optionally, based on the embodiment illustrated in FIG. 3, the BMP module 302 is further configured to send a second peer up notification targeted at the network device to the monitoring server, where the second peer up notification carries the BGP capabilities enabled on the network device and the device identifier of the network device.

In other words, when the network device has established a BGP connection with the virtual peer, the BMP module can send the first peer up notification targeted at the virtual peer to the monitoring server, and can also send the second peer up notification targeted at the network device to the monitoring server. The second peer up notification carries the BGP capabilities enabled on the network device, which are acquired by means of negotiation between the network device and the virtual peer about their own enabled BGP capabilities. By way of an example, all the BGP capability data configured in the network device include three BGP capabilities in total, which are IPv4 Unicast, IPv4 Multicast, and IPv6 Unicast, and only one of the BGP capabilities is currently enabled on the network device, which is IPv4 Unicast. The network device creates the virtual peer, and enables all the three BGP capabilities including IPv4 Unicast, IPv4 Multicast, and IPv6 Unicast on the virtual peer, and after negotiating with the virtual peer about their own enabled BGP capabilities, the BMP module sends the first peer up notification to the monitoring server, and the monitoring server acquires all the three BGP capabilities including IPv4 Unicast, IPv4 Multicast, and IPv6 Unicast from the first peer up notification sent by the BMP module, but the monitoring server cannot know which capabilities are enabled on the network device, and which capabilities are disabled on the network device. The monitoring server acquires the BGP capability enabled in the network device, for example, IPv4 Unicast, from the second peer up notification targeted at the network device sent by the BMP module, so that the monitoring server determines, among all the BGP capabilities of the network device, that the enabled BGP capability is IPv4 Unicast, and the disabled BGP capabilities are IPv4 Multicast and IPv6 Unicast.

After the monitoring server acquires the first peer up notification and the second peer up notification, the monitoring server can distinguish the disabled BGP capabilities from the enabled BGP capability among all the BGP capability data, thereby further improving the knowledge of the monitoring server about all the BGP capability data of the network device. If there is a need to extend a function of the network, or to deploy network devices in the network again, the monitoring server can determine, from the acquired enabled BGP capabilities and disabled BGP capabilities of the network devices, which network devices can enable directly the capability to be extended, without being additionally configured with a protocol, thereby improving the efficiency of extending the capability of the network or deploying again the network devices, and saving resources and operating costs of the network.

As can be seen that, the capability of a network device can be extended so that the BGP module of the network device can acquire all BGP capabilities configured in the network device by means of interaction between a BGP module and a BMP module, and the network device creates a virtual peer, and enables all the BGP capabilities in the acquired data on the virtual peer; and when the network device and the virtual peer negotiate about their own enabled BGP capabilities, the BMP module will acquire the BGP capabilities enabled on the virtual peer, for example, all the BGP capability data configured in the network device, and the BMP module will send the first peer up notification targeted at the virtual peer to the monitoring server so that the monitoring server can acquire all the BGP capability data of the network device, namely including the enabled and disabled BGP capabilities, so the monitoring server can know comprehensively real capabilities supported by the entire network, further providing an effective basis for deployment of and decision on the entire network.

Embodiment 3

Figure 5:
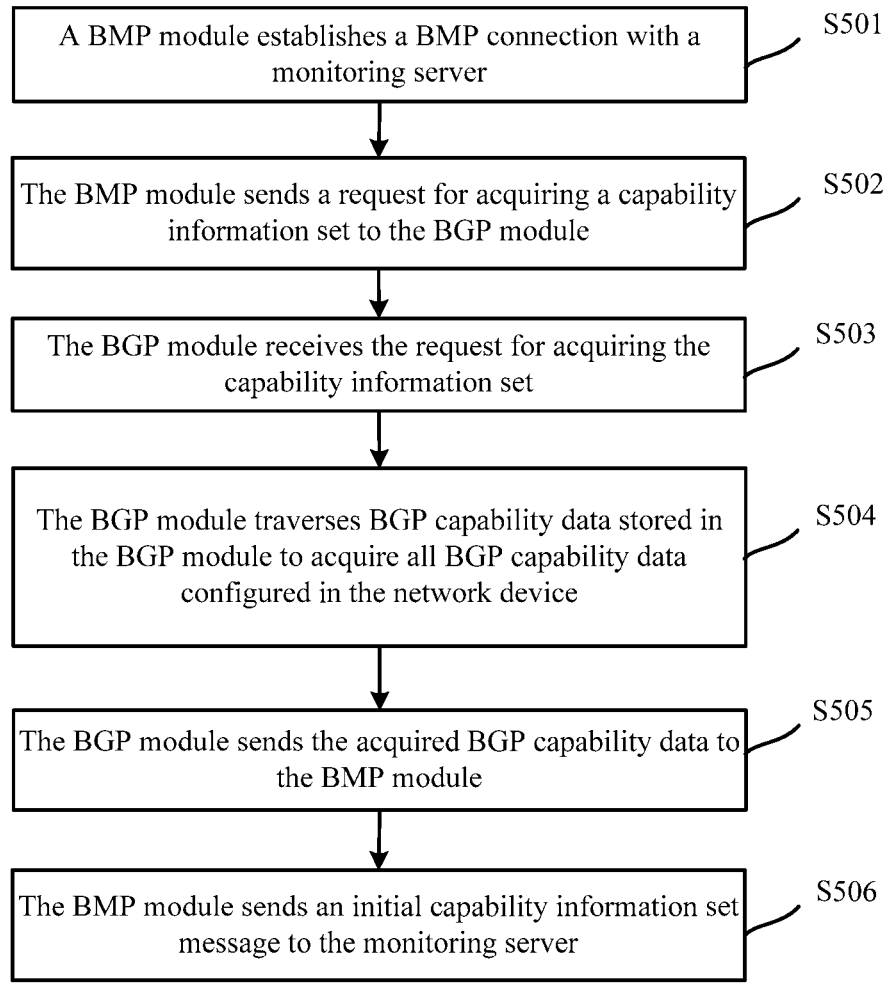
FIG. 5 is a flow chart of a method for sending BGP information according to an embodiment of the application.

FIG. 5 is a flow chart of a method for sending BGP information according to an embodiment of the application, where a network device includes a BGP module and a BMP module, and the method includes the following steps.

S501: The BMP module establishes a BMP connection with a monitoring server.

S502: The BMP module sends a request for acquiring a capability information set to the BGP module.

It shall be noted herein that the request for acquiring the capability information set is a function performed by the BMP module after extension. The BMP module can act in the network device 100 to send the request for acquiring the capability information set to the BGP module, and interaction between the BGP module and the BMP module in the network device can be in the form of a signaling message, or can be in the form of a recalled function interface, which is not limited by the present application thereto.

S503: The BGP module receives the request for acquiring the capability information set.

S504: The BGP module traverses BGP capability data stored in the BGP module and acquires all the BGP capability data configured in the network device.

S505: The BGP module sends the acquired all BGP capability data to the BMP module.

It shall be noted herein that the BGP capability data can be stored in the BGP module respectively in storage spaces of units performing corresponding BGP capabilities, or in a BGP capability set, for example, a BGP capability list. Table 1 depicts a representation of the BGP capability list.

The BGP module traverses the BGP capability data stored in the BGP module (for example, the BGP capabilities respectively stored in the respective storage spaces, or the list as depicted in Table 1) to acquire all the BGP capability data. It shall be noted that although the BGP module can traverse to acquire all the BGP capability data, the BGP module cannot determine, among all the BGP capability data, which BGP capabilities are enabled on the network device, and which BGP capabilities are disabled on the network device.

S506: The BMP module sends all the BGP capability data, and a device identifier of the network device to the monitoring server.

Specifically the BMP module 102 can carry all the BGP capability data, and the device identifier of the network device in an initial capability information set message, and further send the initial capability information set message to the monitoring server. More specifically, all the BGP capability data and the device identifier of the network device are carried in an optional parameter field of the initial capability information set message.

The initial capability information set message is a BMP message created by extending a BMP rule, and can be used to carry all the BGP capability data, and fields in the initial capability information set message are encapsulated in the same format as the BGP OPEN Message as depicted in FIG. 11.

All the BGP capability data may be encapsulated in a field of the initial capability information set message. Optionally, all the BGP capability data may be encapsulated in the field of optional parameters of the initial capability information set message.

Figure 6:
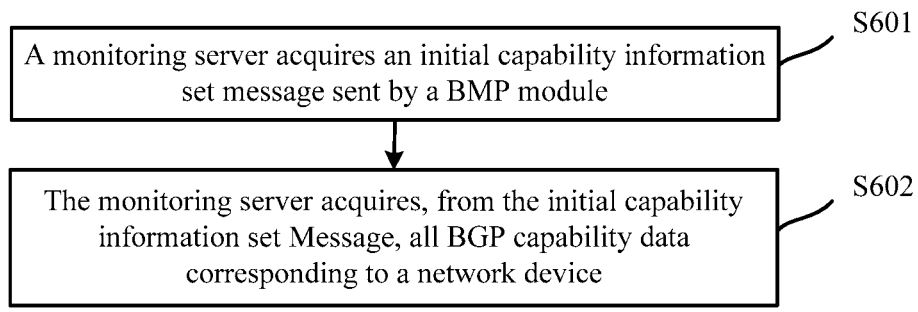
FIG. 6 is a flow chart of a method for acquiring BGP information according to an embodiment of the application.

After the BMP module of the network device sends the initial capability information set message to the monitoring server, the monitoring server further processes the initial capability information set message. Based on the embodiment illustrated in FIG. 5, reference is made to FIG. 6 which is a flow chart of a method for acquiring BGP information according to an embodiment of the application, where the method includes the following steps.

S601: The monitoring server acquires the initial capability information set message sent by the BMP module.

S602: The monitoring server acquires all the BGP capability data corresponding to the network device from the initial capability information set message.

It shall be noted that although the monitoring server can decapsulate the initial capability information set message, and determine all the BGP capability data corresponding to the network device according to the device identifier, the monitoring server can not determine, among all the BGP capability data, which BGP capabilities are enabled on the network device, and which BGP capabilities are disabled on the network device. So that it may not be sufficient in accuracy for the monitoring server to take the acquired all BGP capability data as a basis for deployment of and decision on the entire network. In view of this, optionally based on the embodiment illustrated in FIG. 5 or FIG. 6, when the network device establishes a BGP connection with another network device, the BMP module is further configured to send a peer up notification targeted at the network device to the monitoring server, where the peer up notification message carries BGP capabilities enabled in the network device.

In other words, when the network device establishes the BGP connection with another network device, they negotiate with each other about their enabled BGP capabilities so that the BMP module sends the peer up notification carrying the BGP capabilities enabled in the network device to the monitoring server. By way of an example, all the BGP capabilities configured in the network device include three BGP capabilities in total, which are IPv4 Unicast, IPv4 Multicast, and IPv6 Unicast, and only one of the BGP capabilities is currently enabled on the network device, which is IPv4 Unicast. The monitoring server acquires all the three BGP capabilities including IPv4 Unicast, IPv4 Multicast, and IPv6 Unicast from the initial capability information set message sent by the BMP module, but does not know which capabilities are enabled on the network device, and which capabilities are disabled on the network device; and the monitoring server acquires the BGP capability enabled in the network device, for example, IPv4 Unicast, from the peer up notification targeted at the network device sent by the BMP module, so that the monitoring server determines, among all the BGP capabilities of the network device, that the enabled BGP capability is IPv4 Unicast, and the disabled BGP capabilities are IPv4 Multicast and IPv6 Unicast.

In other words, the monitoring server acquires not only all the BGP capability data of the network device, but also the enabled BGP capability of the network device, so that the monitoring server can distinguish the disabled BGP capabilities from the enabled BGP capability among all the BGP capability data, thereby further improving the knowledge of the monitoring server about all the BGP capability data of the network device. If there is a need to extend a function of the network, or to deploy network devices in the network again, the monitoring server can determine, from the acquired enabled BGP capabilities and disabled BGP capabilities of the network devices, which network devices can enable directly the capability to be extended, without being additionally configured with a protocol, thereby improving the efficiency of extending the capability of the network or deploying again the network devices, and saving resources and operating costs of the network.

As can be seen that, the capability of a network device can be extended so that the network device can acquire all BGP capabilities configured in the network device by means of interaction between a BGP module and a BMP module, and send to the monitoring server all the BGP capability data carried in the initial capability information set message by using an extended BMP message, so that the monitoring server can acquire all the BGP capabilities supported by the network device, namely including the enabled and disabled BGP capabilities, so the monitoring server can know comprehensively real capabilities supported by the entire network, further providing an effective basis for deployment of and decision on the entire network.

Embodiment 4

Figure 7:
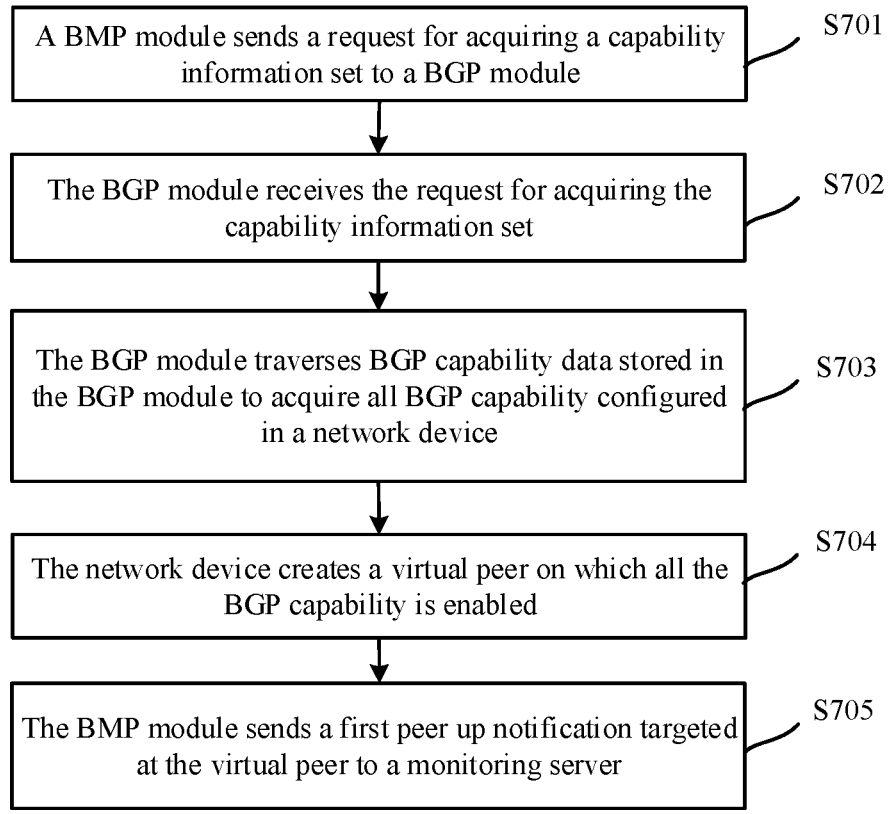
FIG. 7 is a flow chart of a method for sending BGP information according to an embodiment of the application.

FIG. 7 is a flow chart of a method for sending BGP information according to an embodiment of the application, and as illustrated in FIG. 7, where a network device includes a BGP module and a BMP module, and the method includes the following steps.

S701: The BMP module sends a request for acquiring a capability information set to the BGP module.

It shall be noted herein that the request for acquiring the capability information set is a function performed by the BMP module after extension. The BMP module can act in the network device to send the request for acquiring the capability information set to the BGP module, and interaction between the BGP module and the BMP module in the network device can be in the form of a signaling message, or can be in the form of a recalled function interface, which is not limited by the present application thereto.

S702: The BGP module receives the request for acquiring the capability information set.

S703: The BGP module traverses BGP capability data stored in the BGP module to acquire all the BGP capability data configured in the network device.

It shall be noted herein that the BGP capability data can be stored in the BGP module respectively in storage spaces of units performing corresponding BGP capabilities, or in a BGP capability set, for example, a BGP capability list. Table 1 depicts a representation of the BGP capability list.

The BGP module traverses the BGP capability data stored in the BGP module (for example, the BGP capabilities respectively stored in the respective storage spaces, or the list as depicted in Table 1) to acquire all the BGP capability data. It shall be noted that although the BGP module can traverse to acquire all the BGP capability data, the BGP module cannot determine which BGP capabilities are enabled on the network device, and which BGP capabilities are disabled on the network device, among all the BGP capability data.

Alternatively, the method includes S704 and S705. S704: The network device creates a virtual peer on which all the BGP capability is enabled.

In other words, since all the BGP capability data acquired by the BGP module are enabled on the created virtual peer, the BMP module of the network device, during negotiating with the virtual peer about their own enabled BGP capabilities, can thereby acquire the enabled BGP capabilities of the virtual peer, for example, all the BGP capability data configured in the network device.

It shall be noted here although the network device 300 creates the virtual peer, the virtual peer can be created specifically by a functional module in the network device.

S705: The BMP module sends a first peer up notification targeted at the virtual peer to a monitoring server, where the first peer up notification carries all the BGP capability data enabled in the virtual peer, and location information in the first peer up notification is a device identifier of the network device.

The first peer up notification can be encapsulated in the same format as the peer up notification in the prior art as depicted in FIG. 12. However the location information in the first peer up notification is the device identifier of the network device, where the device identifier can be a router ID, and the like, of the network device. Moreover since the virtual peer does not need to receive an open message of the network device for negotiation, the Received OPEN Message of the first peer up notification can be null.

It shall be noted that upon reception of the first peer up notification, the monitoring server parses the local positional information for the device identifier of the network device to thereby determine all the BGP capability data corresponding to the network device. In other words, based on FIG. 7, FIG.

Figure 8:
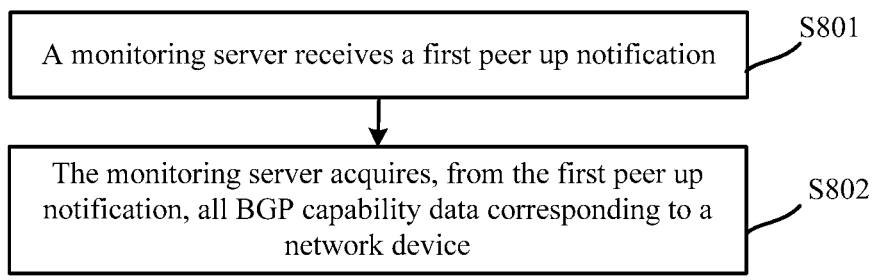
FIG. 8 is a flow chart of a method for acquiring BGP information according to an embodiment of the application.

8 is a flow chart of a method for acquiring BGP information according to an embodiment of the application, as illustrated in FIG. 8.

S801. The monitoring server receives the first peer up notification.

S802: The monitoring server acquires, from the first peer up notification, all the BGP capability data corresponding to the network device.

However the monitoring server 401 cannot distinguish the BGP capabilities enabled on the network device 300 from the BGP capabilities disabled on the network device among all the BGP capability data. So that it may not be sufficient in accuracy for the monitoring server to take the acquired all BGP capability data as a basis for deployment of and decision on the entire network. In view of this, optionally based on the embodiment illustrated in FIG. 7, the BMP module sends a second peer up notification targeted at the network device to the monitoring server, where the second peer up notification carries the BGP capabilities enabled in the network device and the device identifier of the network device.

In other words, when the network device has established a BGP connection with the virtual peer, the BMP module can send the first peer up notification targeted at the virtual peer to the monitoring server, and can also send the second peer up notification targeted at the network device to the monitoring server. The second peer up notification carries the BGP capabilities enabled on the network device, which are acquired by means of negotiation between the network device and the virtual peer about their own enabled BGP capabilities. By way of an example, all the BGP capability data configured in the network device include three BGP capabilities in total, which are IPv4 Unicast, IPv4 Multicast, and IPv6 Unicast, and only one of the BGP capabilities is currently enabled on the network device, which is IPv4 Unicast. The network device creates the virtual peer, and enables all the three BGP capabilities including IPv4 Unicast, IPv4 Multicast, and IPv6 Unicast on the virtual peer, and after negotiating with the virtual peer about their own enabled BGP capabilities, the BMP module sends the first peer up notification to the monitoring server, and the monitoring server acquires all the three BGP capabilities including IPv4 Unicast, IPv4 Multicast, and IPv6 Unicast from the first peer up notification sent by the BMP module, but cannot know which capabilities are enabled on the network device, and which capabilities are disabled on the network device. The monitoring server acquires the BGP capability enabled in the network device, for example, IPv4 Unicast, from the second peer up notification targeted at the network device sent by the BMP module, so that the monitoring server determines that the enabled BGP capability is IPv4 Unicast, and the disabled BGP capabilities are IPv4 Multicast and IPv6 Unicast, among all the BGP capabilities of the network device.

After the monitoring server acquires the first peer up notification and the second peer up notification, the monitoring server can distinguish the disabled BGP capabilities from the enabled BGP capability among all the BGP capability data, thereby further improving the knowledge of the monitoring server about all the BGP capability data of the network device. If there is a need to extend a function of the network, or to deploy network devices in the network again, the monitoring server can determine, from the acquired enabled BGP capabilities and disabled BGP capabilities of the network devices, which network devices can enable directly the capability to be extended, without being additionally configured with a protocol, thereby improving the efficiency of extending the capability of the network or deploying again the network devices, and saving resources and operating costs of the network.

As can be seen that, the capability of a network device can be extended so that the BGP module of the network device can acquire all BGP capabilities configured in the network device by means of interaction between a BGP module and a BMP module, and the network device creates a virtual peer, and enables all the BGP capabilities in the acquired data on the virtual peer; and when the network device and the virtual peer negotiate about their own enabled BGP capabilities, the BMP module acquires the BGP capabilities enabled on the virtual peer, for example, all the BGP capability data configured in the network device, and the BMP module sends the first peer up notification targeted at the virtual peer to the monitoring server so that the monitoring server can acquire all the BGP capability data of the network device, namely including the enabled and disabled BGP capabilities, so the monitoring server can know comprehensively real capabilities supported by the entire network, further providing an effective basis for deployment of and decision on the entire network.

Embodiment 5

Figure 9:
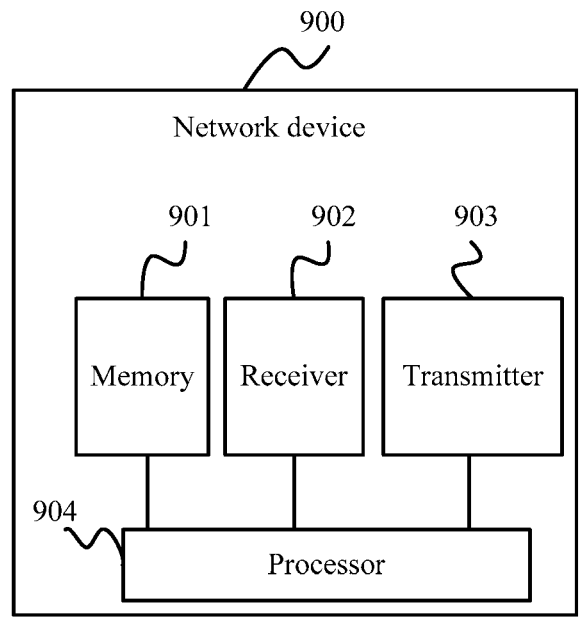
FIG. 9 is a schematic structural diagram of hardware of a network device according to an embodiment of the application.

Referring to FIG. 9. FIG. 9 is a schematic structural diagram of hardware of a network device according to an embodiment of the application, where the network device 900 includes a BGP module and a BMP module, and the network device 900 includes a memory 901, a receiver 902, and a transmitter 903, and a processor 904 coupled respectively with the memory 901, the receiver 902 and the transmitter 903; where the memory 901 is configured to store a set of program instructions, and the processor 904 is configured to invoke the program instructions stored in the memory 901 to perform the operations of:

establishing a BMP connection with a monitoring server;

triggering the transmitter 903 to send to the BGP module a request for acquiring a capability information set;

triggering the receiver 902 to receive the request for acquiring the capability information set;

traversing BGP capability data stored in the BGP module to acquire all the BGP capability data configured in the network device;

triggering the transmitter 903 to send the acquired all BGP capability data to the BMP module; and triggering the transmitter 903 to send to the monitoring server all the BGP capability data and a device identifier of the network device. Specifically the BMP module 102 can carry all the BGP capability data, and the device identifier of the network device in an initial capability information set message, and further send the initial capability information set message to the monitoring server. More specifically, the BMP module can carry all the BGP capability data, and the device identifier of the network device in a field of optional parameter of the initial capability information set message.

Optionally the processor 904 can be a central processing unit (CPU), the memory 901 can be an internal memory of the random access memory (RAM) type, and the receiver 902 and the transmitter 903 can include general physical interfaces, which can be Ethernet interfaces or asynchronous transfer mode (ATM) interfaces. The processor 904, the transmitter 903, the receiver 902, and the memory 901 can be integrated into one or more separate circuits or pieces of hardware, for example, application specific integrated circuits (ASICs).

Embodiment 6

Figure 10:
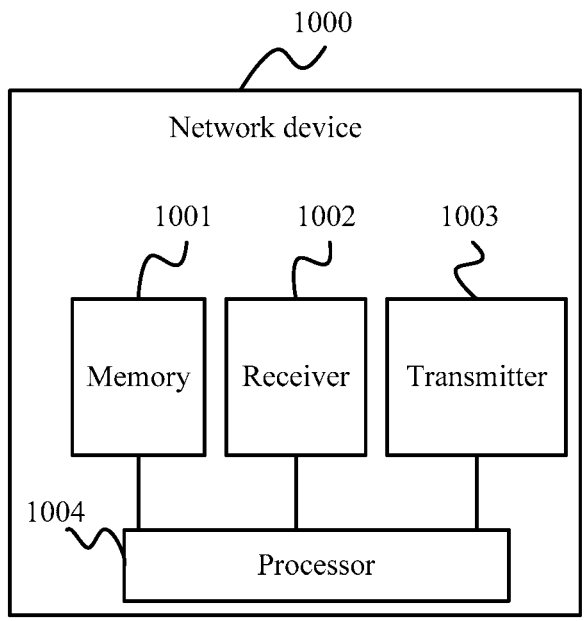
FIG. 10 is a schematic structural diagram of hardware of a network device according to an embodiment of the application.

Referring to FIG. 10, FIG. 10 is a schematic structural diagram of hardware of a network device according to an embodiment of the application, where the network device 1000 includes a BGP module and a BMP module, and the network device 1000 includes a memory 1001, a receiver 1002, and a transmitter 1003, and a processor 904 connected respectively with the memory 1001, the receiver 1002 and the transmitter 1003; where the memory 1001 is configured to store a set of program instructions, and the processor 1004 is configured to invoke the program instructions stored in the memory 1001 to perform the operations of:

triggering the transmitter 1003 to send to the BGP module a request for acquiring a capability information set;

triggering the receiver 1002 to receive the request for acquiring the capability information set;

traversing BGP capability data stored in the BGP module to acquire all the BGP capability data configured in the network device.

Alternatively, the processor 1004 is configured to invoke the program instructions stored in the memory 1001 to perform the operations of: creating a virtual peer on which all the BGP capabilities are enabled; and triggering the transmitter 1003 to send a first peer up notification targeted at the virtual peer to a monitoring server, where the first peer up notification carries all the BGP capability data enabled in the virtual peer, and location information in the first peer up notification is a device identifier of the network device.

Optionally the processor 1004 can be a CPU, the memory 901 can be an internal memory of the RAM type, and the receiver 1002 and the transmitter 1003 can include general physical interfaces, which can be Ethernet interfaces or ATM interfaces. The processor 1004, the transmitter 1003, the receiver 1002, and the memory 1001 can be integrated into one or more separate circuits or pieces of hardware, for example, ASIC.

"First" in the first peer up notification as referred to in the embodiments of the application is merely intended to identify the message in question but not to suggest the first message in order. The same will applicable to "second".

It should be noted that persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a magnetic disk, an optical disc, a read-only memory (ROM), or a random access memory (RAM).

A network device and method for sending BGP information according to the application have been described above in details, the principle and the embodiments of the application have been set forth in this context with connection with the particular embodiments thereof, and the foregoing description of the application is merely intended to facilitate understanding of the method of the application and the core idea thereof. At the same time, those skilled in the art can make variations to the particular embodiments and their application scopes without departing from the spirit of the application. In summary, the disclosure of this specification shall not be construed as limiting the application thereto.

What is claimed is:

1. A method comprising:
   creating a virtual peer on a network device, wherein the virtual peer enables all border gateway protocol (BGP) capabilities configured on the network device;
   acquiring, by a border gateway protocol monitoring protocol (BMP) module of the network device, the enabled BGP capabilities.

2. The method of claim 1, further comprising:
   sending, by the BMP module, a first peer up notification targeted at the virtual peer to a monitoring server, wherein the first peer up notification carries the BGP capability enabled on the virtual peer.

3. The method of claim 2, wherein the first peer up notification comprises location information.

4. The method of claim 3, wherein the location information is a device identifier of the network device.

5. The method of claim 4, wherein the device identifier of the network device is a router ID.

6. The method of claim 1, further comprising:
   sending, by the BMP module, an initial capability information set message to a monitoring server, wherein the initial capability information set message comprises the BGP capability enabled on the virtual peer.

7. The method of claim 6, wherein the initial capability information set message further comprises the location information.

8. The method of claim 3, further comprising:
   sending, by the BMP module, an initial capability information set message to a monitoring server, wherein the initial capability information set message comprises the location information.

9. The method of claim 6, wherein the initial capability information set message comprises an optional parameter field, and the optional parameter field carries the BGP capability enabled on the virtual peer.

10. The method of claim 1, wherein the BGP capability configured on the network device comprises a BGP capability that is not enabled on the network device.

11. The method of claim 1, further comprising:
    sending, by the BMP module, a second peer up notification targeted at the network device to a monitoring server, wherein the second peer up notification comprises a BGP capability that is enabled on the network device.

12. The method of claim 1, further comprising:
    negotiating, by the network device, with the virtual peer about their own enabled BGP capabilities.

13. The method of claim 1, wherein the capability information enabled on the virtual peer comprises all capabilities configured on the network device.

14. A network device comprises:
    a non-transitory storage storing a set of program instructions;
    a processor configured to invoke the program instructions to perform the steps of:
       creating a virtual peer on the network device, wherein the virtual peer enables all border gateway protocol (BGP) capabilities configured on the network device;
       acquiring the enabled BGP capabilities.

15. The network device of claim 14, where the processor is configured to invoke the program instructions to further perform the step of:
    sending, by the BMP module, a first peer up notification targeted at the virtual peer to a monitoring server, wherein the first peer up notification carries the BGP capability enabled on the virtual peer.

16. The network device of claim 14, where the first peer up notification comprises location information.

17. The network device of claim 16, where the location information is a device identifier of the network device.

18. The network device of claim 17, where the device identifier of the network device is a router ID.

19. The network device of claim 16, where the processor is configured to invoke the program instructions to further perform the step of:

sending an initial capability information set message to a monitoring server, where the initial capability information set message comprises the location information.

20. The network device of claim 19, where the initial capability information set message comprises an optional parameter field, and the optional parameter field carries the BGP capability enabled on the virtual peer.

\* \* \* \* \*